(12) United States Patent
Feltgen et al.

(10) Patent No.: US 9,541,442 B2
(45) Date of Patent: Jan. 10, 2017

(54) FILL LEVEL MONITORING

(75) Inventors: Martin Feltgen, Wuppertal (DE); Johannes Sinstedten, Korchenbroich (DE)

(73) Assignee: BEKO TECHNOLOGIES GMBH, Neuss (DE)

(*) Notice: Subject to any disclaimer, the term of this patent is extended or adjusted under 35 U.S.C. 154(b) by 243 days.

(21) Appl. No.: 14/343,728

(22) PCT Filed: Aug. 14, 2012

(86) PCT No.: PCT/EP2012/065909
§ 371 (c)(1),
(2), (4) Date: Mar. 7, 2014

(87) PCT Pub. No.: WO2013/034412
PCT Pub. Date: Mar. 14, 2013

(65) Prior Publication Data
US 2014/0202559 A1    Jul. 24, 2014

(30) Foreign Application Priority Data
Sep. 8, 2011  (DE) .................. 10 2011 053 407

(51) Int. Cl.
  *F16K 21/18*  (2006.01)
  *G05D 9/12*  (2006.01)
  (Continued)

(52) U.S. Cl.
  CPC ........... *G01F 23/266* (2013.01); *G01F 23/244* (2013.01); *G01F 23/263* (2013.01);
  (Continued)

(58) Field of Classification Search
  CPC .................. Y10T 137/7306; Y10T 137/8342; Y10T 137/0324; Y10T 137/7287; Y10T 137/7313; Y10T 137/7761; Y10T 137/3052; G01F 23/266; G01F 23/263; G01F 23/244; G05D 9/12; G05D 9/00
  (Continued)

(56) References Cited

U.S. PATENT DOCUMENTS 3,901,079 A * 8/1975 Vogel .................... G01F 23/263
                                                          73/304 C
3,967,191 A * 6/1976 Roche .................. G01R 31/245
                                                          324/414
(Continued)

FOREIGN PATENT DOCUMENTS

EP       0391250 B1    9/1994
EP       2348293 A1    7/2011
(Continued)

OTHER PUBLICATIONS

International Search Report issued Jan. 10, 2013 re: PCT/EP2012/065909; citing: US 6 407 557 B1, EP 0 391 250 B1, US 6 339 335 B1, EP 2 348 293 A1, FR 2 605 731 A1, GB 2 137 349 A, US 3 901 079 A and FR 2 782 802 A1.

*Primary Examiner* — Mary McManmon
*Assistant Examiner* — Hailey K Do
(74) *Attorney, Agent, or Firm* — Cantor Colburn LLP

(57) ABSTRACT

Fill level monitoring relates to a method for controlling the fill level of a collecting vessel, wherein the collecting vessel could be filled with a dielectric medium. A fill level is monitored by a monitoring circuit with a measuring capacitor, the capacity of which changes steadily in correlation with the fill level, at least beyond a fill level range of the collecting vessel. The method includes: determining a capacity of the measuring capacitor; determining the quality of the measuring capacitor; determining a permittivity of the dielectric medium on the basis of the quality of the measuring capacitor; determining a fill level of the collecting (Continued)

vessel on the basis of the determined capacity of the measuring capacitor and the permittivity of the dielectric medium; and fill level-dependent drainage of the dielectric medium from the collecting vessel.

12 Claims, 2 Drawing Sheets

(51) Int. Cl.
  *F16T 1/14* (2006.01)
  *G01F 23/26* (2006.01)
  *G01F 23/24* (2006.01)
  *G05D 9/00* (2006.01)
  *G01F 25/00* (2006.01)

(52) U.S. Cl.
  CPC .......... *G01F 25/0076* (2013.01); *G05D 9/00* (2013.01); *G05D 9/12* (2013.01); *Y10T 137/7287* (2015.04); *Y10T 137/7306* (2015.04); *Y10T 137/7313* (2015.04)

(58) Field of Classification Search
  USPC ....... 137/183, 187, 203, 204, 386, 387, 391, 137/392, 393
  See application file for complete search history.

(56) References Cited

U.S. PATENT DOCUMENTS

| | | | |
|---|---|---|---|
| 5,469,879 A * | 11/1995 | Rasmussen | F16T 1/00 |
| | | | 137/187 |
| 6,339,335 B1 | 1/2002 | Froger et al. | |
| 6,407,557 B1 | 6/2002 | Coudray et al. | |
| 7,222,526 B2 * | 5/2007 | Baker | G01F 23/266 |
| | | | 73/290 R |
| 7,665,358 B2 * | 2/2010 | Calabrese | G01F 23/268 |
| | | | 73/290 R |
| 7,721,802 B2 * | 5/2010 | Levy | E21B 47/042 |
| | | | 166/250.03 |
| 8,651,824 B2 * | 2/2014 | Ward | F04B 49/04 |
| | | | 417/36 |
| 2010/0121257 A1 * | 5/2010 | King | A61M 1/0058 |
| | | | 604/22 |
| 2010/0154534 A1 * | 6/2010 | Hampton | G01F 23/265 |
| | | | 73/304 C |

FOREIGN PATENT DOCUMENTS

| | | |
|---|---|---|
| FR | 2605731 A1 | 4/1988 |
| FR | 2782802 A1 | 3/2000 |
| GB | 2137349 A | 10/1984 |

* cited by examiner

FILL LEVEL MONITORING

FIELD

The disclosure relates to a method for the fill level monitoring of a collecting vessel capable of being filled with a dielectric medium, preferably condensate, as well as an associated monitoring circuit for a measuring capacitor, which has a steadily changing capacitance as a function of a fill level of the collecting vessel. Furthermore, the disclosure relates to a condensate drain valve and a condensate drain.

BACKGROUND

Condensate drains, which automatically drain condensate forming in steam lines or pressure lines into a condensate collecting vessel without gas, for example in the form of water vapour or compressed air, exiting to a notable extent from the line, usually comprise fill level monitoring.

In compressed air technology, condensate drains are used to drain condensates out of pressure line networks. The condensates essentially arise from the humidity of the ambient air which is sucked in by the compressed air compressor. There are various designs of condensate drains. In principle, they operate in such a way that a valve is opened, as a result of which the condensate is expelled from the compressed air network by the pressure present therein. The devices differ according to the type of control of the valve and its power supply.

Float-type drains operate with a hollow body, which is raised by its buoyancy in the collecting condensate and thus actuates a valve. This valve usually opens a drain opening indirectly by means of a servo-control, through which drain opening the condensate is ejected.

Furthermore, conventional electrically operated, time-controlled solenoid valves open at adjustable, but preset time intervals. A drawback is that these solenoid valves also open with an absence of condensate independently of the fill level, as a result of which high energy losses arise due to discharged compressed air.

Electronically level-controlled valves, on the other hand, detect an accumulating quantity of liquid via an electronic sensor, which enables quantitative monitoring of the fill level. When a specific quantity is reached, a valve is opened and precisely this quantity is drained off without losses of compressed air. Condensate drains with electronically level-controlled valves are therefore particularly advantageous on account of the small compressed air and therefore energy losses and have become established.

Particular importance is attached to condensate drains which operate with a capacitive measurement for the fill level detection and in particular with servo-controlled diaphragm valves. The capacitive measurement detects the fill level of a condensate collecting vessel on the basis of the electrical capacitance, which changes with the fill level when the condensate flows in as a dielectric medium. Since the condensate is polluted with oil and/or dirt to a varying extent depending on the operating and ambient conditions and these additional contents have a considerable influence on the capacitance, this fill level monitoring may possibly not be able to be evaluated unequivocally in respect of the actual fill level.

EP 0391250 B1 describes, for example, a device for draining condensate from compressed air systems or suchlike, with a collecting chamber for condensate permanently connected to the compressed air system and with a diaphragm valve closing the outlet of the collecting chamber, wherein two capacitive sensors detecting different fill levels and controlling the diaphragm valve via electronics and a control valve are disposed in the collecting chamber. The sensors are disposed at a vertical distance from one another in a pipe projecting vertically into the collecting chamber and closed at the external end, said sensors being connected electrically to a control valve controlling a pilot-control outlet from the collecting chamber.

Therefore, a need exists for a method for detecting the actual fill level more reliably and a circuit for fill level monitoring or fill level control.

SUMMARY

According to the disclosure, a method for the fill level control of a collecting vessel, a device for the fill level monitoring of a collecting vessel, a controlled condensate drain valve, and a condensate drain are described herein. Further advantageous embodiments can be derived from the following description. The individual features of the described embodiments are not however limited thereto, but can be combined with one another arbitrarily and with other features to form further embodiments.

A method for the fill level control of a collecting vessel is proposed, wherein the collecting vessel is capable of being filled with a dielectric medium. The fill level is monitored by means of a monitoring circuit with a measuring capacitor, the capacitance whereof steadily changes in correlation with the fill level at least over a fill level range of the collecting vessel. The method comprises the following steps:
  ascertainment of a capacitance of the measuring capacitor;
  ascertainment of the quality of the measuring capacitor;
  determination of a permittivity of the dielectric medium on the basis of the quality of the measuring capacitor;
  determination of a fill level of the collecting vessel on the basis of the ascertained capacitance of the measuring capacitor and the permittivity of the dielectric medium;
  fill level-dependent drainage of the dielectric medium from the collecting vessel, for example at a preset fill level.

The advantage of the proposed method is a more precise and more reliable qualitative fill level control. The measured capacitance, which is intended to be an indication of the actual fill level, is dependent both on the fill level and also on the permittivity of the collecting dielectric medium. It has been shown that the permittivity can be derived from the measured quality and an unequivocal and precise ascertainment of the fill level is thus enabled by determining the two variables capacitance and permittivity. Since different permittivities of the dielectric medium result on account of possible different compositions, the detection of the capacitance at best provides a precise fill level indication, i.e. one that corresponds to the actual fill level, for a fixed composition of the dielectric medium. By means of the quality determination according to the disclosure, conclusions can be drawn as to the composition of the dielectric medium, so that the assignment between capacitance and fill level can accordingly be corrected, for example scaled. Furthermore, a plausibility check is possible on the basis of the measurement of capacitance and quality, which increases the reliability of the method. Thus, a malfunction or an electromagnetic interfering influence can be indicated by one or both measured variables exceeding or falling below preset values.

According to the disclosure, the dielectric medium can be any material with any state of aggregation that can be filled into the collecting vessel. Preferably, it is a condensate with water as the main constituent. Additives are for example oils and/or solid, for example metallic, particles.

Within the meaning of the disclosure, the quality is intended to be a measure of the damping of an oscillatory system, for example of the measuring capacitor or the monitoring circuit. The quality generally describes the extent to which energy can be stored in an oscillatory system in relation to the converted loss energy.

In an embodiment, provision is made such that the quality of the measuring capacitor is ascertained by determining the difference between output voltages of the monitoring circuit before and after a change in the circuit quality of the monitoring circuit. The measuring capacitor is preferably interconnected in an SC element. In an embodiment, the SC element comprises, apart from the measuring capacitor, at least one preferably single-pole changeover switch, which connects the measuring capacitor alternately to an input voltage and to an output. Two or more switches can also be provided to form an SC element. The basic principle of the SC element is that the capacitor is switched alternately between input voltage and output.

Switched capacitor elements (SC elements) are normally used in analog filter switches. By means of this design, it is possible whilst complying with specific boundary conditions to construct a filter, the threshold frequency whereof depends for example only on the control frequency for the SC elements. The use of SC elements in sensors has not hitherto been known.

It can be seen that, in an SC element, a notional equivalent resistance is dependent on the size of the employed capacitor and the employed switching frequency. The capacitance of the employed capacitor can thus be calculated back from the equivalent resistance and the applied switching frequency, so that the pure capacitance of the unknown sensor-capacitor can thus be determined.

Within the meaning of the disclosure, input voltage is understood to mean the voltage present at the SC element at the current or voltage source side. This does not necessarily have to be the supply voltage for the circuit. On the contrary, provision is made in a variant such that at least one, for example, variable resistor is connected upstream of the SC element. The input voltage is preferably applied at a terminal of the changeover switch.

Within the meaning of the disclosure, the output of the SC element is the terminal of the SC element, or of the changeover switch, which is opposite to the input voltage. The capacitor is connected for example to the common centre terminal of the changeover switch.

Provision is made in an embodiment such that, in order to change the operating point or the circuit quality, at least one ohmic resistor in series with the at least one switching module, in particular of the SC element, is increased. In an embodiment, the resistor is switched on or a bypass of the resistor is interrupted. In a further embodiment, provision is made such that the value of the resistance is changed, in particular by activation a potentiometer. In a preferred embodiment, provision is made such that a variable or switchable resistor is connected upstream of the SC element. The operating point of the monitoring circuit is changed by changing the resistor.

If only physically ideal components were to participate in the circuit, a shift in the operating point of the circuit either by adjusting the pulse/pause ratio of the switching frequency or by inserting additional resistors would have no effect. For the actual components, however, a significant and reproducible change in the properties of the circuit appears, which permits a correlation to the quality of the sensor-capacitor. The divergence is not necessarily only positive or negative, the actual direction depending on the nature of the manipulation of the operating point of the circuit. The difference between "normal capacitance" and "ascertained capacitance with a shifted operating point" is preferably evaluated. These divergences can be represented for example in a characteristic map. A microcontroller can find the associated correlation in this characteristic map and preferably carry out an evaluation with respect to the quality of the monitoring circuit or of the capacitor. Since the quality of the capacitor in turn correlates with the permittivity of the dielectric medium in the collecting vessel, a conclusion can be drawn as to the permittivity of the dielectric medium.

The fill level-dependent drainage of the dielectric medium in the sense of the disclosure is to be interpreted broadly and includes, for example, the duration, the quantity, the time and/or the frequency of the drainage as a function of the ascertained fill level.

In an embodiment, provision is made such that the dielectric medium is drained from the collecting vessel when a preset fill level in the collecting vessel is exceeded.

For example, the drain valve is opened when the fill level has exceeded a defined value. Furthermore, provision is made in an embodiment such that the drain valve is closed when the fill level has fallen below a specific value. In a further preferred embodiment, a degree of opening of the diaphragm valve, which determines the volume flow through the drain valve, is determined as a function of the ascertained fill level. For example, the drain valve is opened to the maximum when the fill level has reached a defined maximum and is closed when the fill level has reached a defined minimum.

Furthermore, a monitoring circuit for monitoring the fill level of a collecting vessel is proposed, wherein the collecting vessel is capable of being filled with a dielectric medium. The monitoring circuit comprises at least one measuring capacitor assigned to the collecting vessel, said measuring capacitor having a capacitance that steadily changes with the fill level. The monitoring circuit is designed such that the capacitance of the measuring capacitor and the quality of the measuring capacitor can be ascertained, wherein conclusions can be drawn as to the permittivity of the dielectric medium on the basis of the quality of the measuring capacitor and a fill level of the collecting vessel can be ascertained as a function of the ascertained capacitance of the measuring capacitor and the ascertained permittivity of the dielectric medium. The capacitance of the measuring capacitor varies on the one hand as a function of the fill level of the collecting vessel and on the other hand as a function of the dielectric property of the dielectric medium accumulating in the collecting vessel. The permittivity can be ascertained from the quality of the measuring capacitor, as a result of which the fill level can be determined precisely. For this reason, it is proposed according to the disclosure to ascertain, in addition to the capacitance of the capacitor, also the permittivity of the dielectric medium, in order to ascertain precisely from the acquired data the fill level with a differing composition of the dielectric medium. The proposed fill level monitoring is therefore largely independent of the composition of the dielectric medium present in the collecting vessel. It can for example be an aqueous condensate with a differing oil component. Furthermore, the condensate can comprise metallic solid particles as impurities.

Particularly preferably, the monitoring circuit comprises an SC element, via which a voltage drops at least in correlation with the fill level and the permittivity of the dielectric medium. Means for changing the operating point are also preferably provided, for example a variable or switchable resistor, which is preferably connected upstream of the SC element. A variable resistor is for example a potentiometer, preferably an electronic potentiometer.

Provision is made in an embodiment such that the monitoring circuit can be switched between a first and a second operating state, wherein the capacitance of the measuring capacitor can be ascertained in a first operating state and the quality of the measuring capacitor can be ascertained and a second operating state. In a particularly preferred variant, provision is made such that the operating states are defined by the operating points at which the circuit operates. Switching is preferably made between the operating states by switching on or switching off at least one resistor or by changing a resistor in the monitoring circuit.

The switchability between the operating states makes it possible, at least in part, to use components of the monitoring circuit for two different measuring tasks. A high degree of integration with simultaneous cost reduction is advantageously achieved in the embodiment with a variable operating point of the monitoring circuit, preferably by changing a resistor connected upstream of the SC element.

In a preferred embodiment, the monitoring circuit comprises an operational amplifier, which is connected in particular as an integrator. The output of the SC element is preferably connected to a preferably inverting input of the operational amplifier.

The advantage of the proposed monitoring circuit is that it is very sensitive. Depending on the dimensioning of the employed components, changes in the capacitance of the measuring capacitor can be detected in the range of several femtofarads.

In a particularly preferred embodiment, provision is made such that a measuring capacitor electrode of the measuring capacitor is made available at least in part by the collecting vessel, i.e. the vessel itself that accommodates the dielectric medium.

For example, a first capacitor electrode of the measuring capacitor is disposed inside the volume defined by the collecting vessel that is used to accommodate the dielectric medium, for example centrally therein, and the second capacitor electrode is defined by the preferably metallic collecting vessel. The measuring capacitor is preferably constituted such that the spacings of the electrodes are dimensioned such that a notable capillary effect on a fluid dielectric medium located between the capacitor electrodes is avoided. The spacings are dimensioned with regard to the dielectric medium to be expected. The capacitor electrodes preferably have a spacing of more than approx. 1 cm, particularly preferably more than approx. 5 cm.

The term "approximately" describes a tolerance range which is regarded as normal in the technical field. In particular, "approximately" describes a tolerance of ±10%, preferably ±5%.

In a further embodiment, provision is made such that the collecting vessel comprises a metallic coating on the inside and/or outside, said coating forming the second capacitor electrode. In a further embodiment, the collecting vessel comprises metal or is constituted by metal.

Provision is made in a variant such that the monitoring circuit has the following structure: a changeover switch is connected by the common centre terminal (COM terminal) to an electrode of the measuring capacitor. A first switchable terminal is connected to a variable resistor, for example a potentiometer. The second switchable terminal is connected to an AD input of a microcontroller. The operating point of the monitoring circuit is changed by activating the potentiometer. The monitoring circuit is preferably in a first operating state when the potentiometer has a "low resistance" and in a second operating state when it has a "high resistance". Within the meaning of the disclosure, "low resistance" is understood to mean that the potentiometer has a negligently small resistance, in particular approximately corresponding to the line resistance, for example approx. 1Ω to approx. 1 kΩ, and preferably approx. 1Ω to approx. 100Ω. Within the meaning of the disclosure, "high resistance" is understood to mean that the potentiometer has a resistance which significantly changes the operating point of the monitoring circuit. A high ohmic resistance has, for example, a value of approx. 1 kΩ or more, preferably more than approx. 10 kΩ.

In a preferred embodiment, provision is made such that switchover times of the SC element are varied at least in the second operating state. Within the meaning of the disclosure, the variation of the switchover times is understood to mean a change in the frequency and/or the pulse width of the signal triggering the switching element of the SC element. Advantageously, provision is made such that a change is made from a pulse/pause width ratio of approx. 30% to approx. 50% pulse width (high-level) to approx. 70% to approx. 50% pause width (low-level), preferably approx. 50% pulse width to approx. 50% pause width, to a significantly narrower pulse/pause width ratio of approx. 1% to approx. 20% pulse width to approx. 99% to approx. 80% pause width, preferably approx. 5% pulse width to approx. 95% pause width. At least the quality can be determined in a specific manner or more precisely by the variation in the switchover times.

In a further embodiment, provision is made such that the monitoring circuit comprises two switching modules. Provision is preferably made such that, in the second operating state, a first resistor is connected in series with the first switching module and a second resistor is connected in series with the second switching module. In particular, the first resistor and/or the second resistor are bypassed in the first operating state. The first resistor is preferably connected upstream of the SC element and the second resistor is connected downstream of the SC element.

Furthermore, a controlled condensate drain valve is proposed for draining condensate from a condensate drain, wherein the condensate drain valve comprises a device as described above for the fill level monitoring of a collecting vessel, which serves to accommodate the condensate. The condensate drain valve preferably comprises a diaphragm valve. Provision is made in an embodiment such that a degree of opening of the condensate drain valve can be controlled by means of the device.

Furthermore, a condensate drain is proposed, which comprises at least one condensate collecting vessel and one condensate drain valve. The condensate drain can be used for example in compressed air systems.

BRIEF DESCRIPTION OF THE FIGURES

Further advantageous embodiments emerge from the following drawings. The developments represented therein are however not to be interpreted as limiting, but on the contrary the features described there can be combined with one another and with the features described above to form further embodiments. Furthermore, it is pointed out that the reference numbers indicated in the description of the figures do not limit the scope of protection of the disclosure, but merely refer to the examples of embodiment shown in the figures. Identical parts or parts with an identical function have the same reference numbers in the following. In the figures.

DETAILED DESCRIPTION

Figure 1:
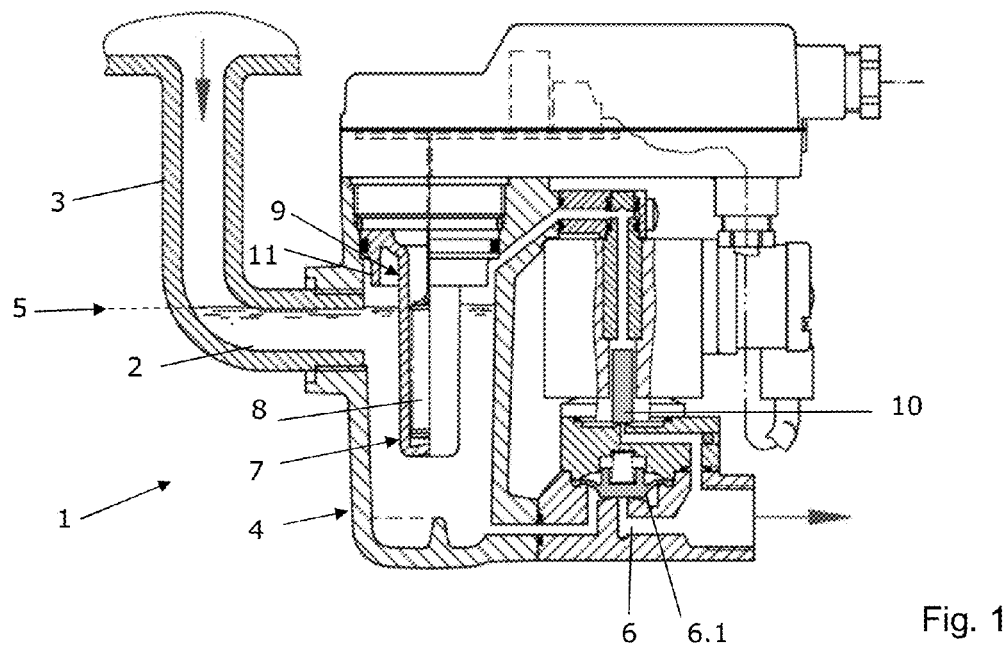
FIG. 1 shows a condensate drain.

FIG. 1 shows a condensate drain 1 for a compressed air system in a cross-sectional view. Condensate 2, which accumulates during the compression of the compressed air, is fed via supply line 3 to condensate drain 1. Condensate 2 arises from the humidity of the ambient air which is sucked in by a compressed air compressor not represented here.

Condensate 2 collects in a condensate collecting vessel 4 and is drained via a drain valve 6 after a defined fill level 5 has been reached. Drain valve 6 is constituted as a diaphragm valve in the embodiment shown in FIG. 1.

A sensor 7 projects into condensate collecting vessel 4. Sensor 7 comprises at least one measuring capacitor 8, which has a capacitance that steadily changes as a function of the fill level of condensate 2 in condensate collecting vessel 4. The capacitive measurement detects the fill level of condensate collecting vessel 4 through the change in the electrical capacitance, when condensate 2 flows in as a dielectric medium. Measuring capacitor 8 comprises only one capacitor electrode. The second electrode required for the function of measuring capacitor 8 is made available at least by a part of the wall of condensate collecting vessel 4, which is connected corresponding to a circuit described in FIG. 2 or FIG. 3.

The shown device is also very reliable in the presence of considerable soiling, for example by rust from the compressed air lines or oil from the compressed air compressors. Sensor 7 is disposed, in its passage through condensate collecting vessel 4, in a clean zone 9, in order to avoid faulty measurements, which are caused for example by deposits which can lead to a measuring short-circuit.

Clean zone 9 is defined by a diving bell-like device 11, which is disposed around sensor 7. No condensate 2 can penetrate into clean zone 9 or into diving bell-like device 11 at any fill level—i.e. even above the maximum provided fill level 5. Since no condensate 2 reaches the upper part of sensor 7, a deposit due to dirt in the condensate is prevented on this part of the sensor. If the deposit comprises conductive materials, such as for example rust particles, a conductive layer is formed on sensor 7, and also on the inner side of condensate collecting vessel 4. As a result of clean zone 9, however, an electrical connection via the conductive deposit and thus a measuring short-circuit between sensor 7 and condensate collecting vessel 4 is prevented.

Clean zone 9 is also required for a supply to servo-controlled drain valve 6. A solenoid valve 10 is used to build up or reduce an auxiliary pressure above valve diaphragm 6.1 in order to close it or open it. The supply from described clean zone 9 of condensate drain 1 takes place with compressed air.

Figure 2:
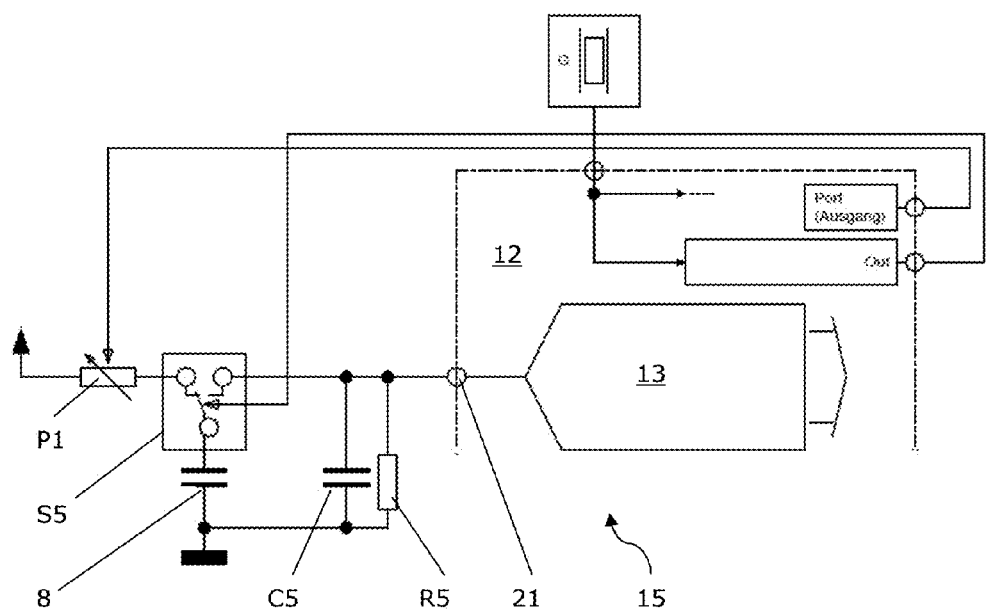
FIG. 2 shows a device for the fill level monitoring of the condensate drain from FIG. 1.

FIG. 2 shows a monitoring circuit 15, which can be used for example to evaluate the fill level of condensate drain 1 from FIG. 1. Measuring capacitor 8 is connected by a changeover switch S5 to an SC element 20. Changeover switch S5 is actuated by microcontroller 12. If changeover switch S5 connects measuring capacitor 8 to the input voltage present behind potentiometer P1, measuring capacitor 8 is charged up with charge $Q=C \cdot U$. In the other switching position, measuring capacitor 8 again yields the same charge. The current flow thus being formed is dependent on the capacitance and the switching frequency: $I=U \cdot C \cdot f$, with current I, input voltage U, capacitance of the measuring capacitor C and switching frequency f. Since $I=U \cdot R$ applies, with R as the equivalent resistance of the SC element, $R=1/(C \cdot f)$.

The voltage falling via resistor R5 connected downstream of the SC element is integrated by means of capacitor C5 and read out from AD transformer input 21 of microcontroller 12. Via the read-out voltage, with low-resistance P1 in the first operating point of monitoring circuit 15, conclusions can be drawn as to the capacitance of measuring capacitor 8. In a further step, P1 is switched to high resistance, so that the operating point of monitoring circuit 15 is shifted significantly. The quality or the permittivity of the dielectric medium is evaluated from the defined switchover of P1 and the ascertained difference between the nominal capacitance in the first operating point and the ascertained capacitance with a shifted operating point. These divergences are preferably filed in a characteristic map in the microcontroller. The task of the microcontroller is, amongst other things, to find the associated correlation in this characteristic map and preferably to carry out a corresponding adaptation of the ascertained fill level.

Figure 3:
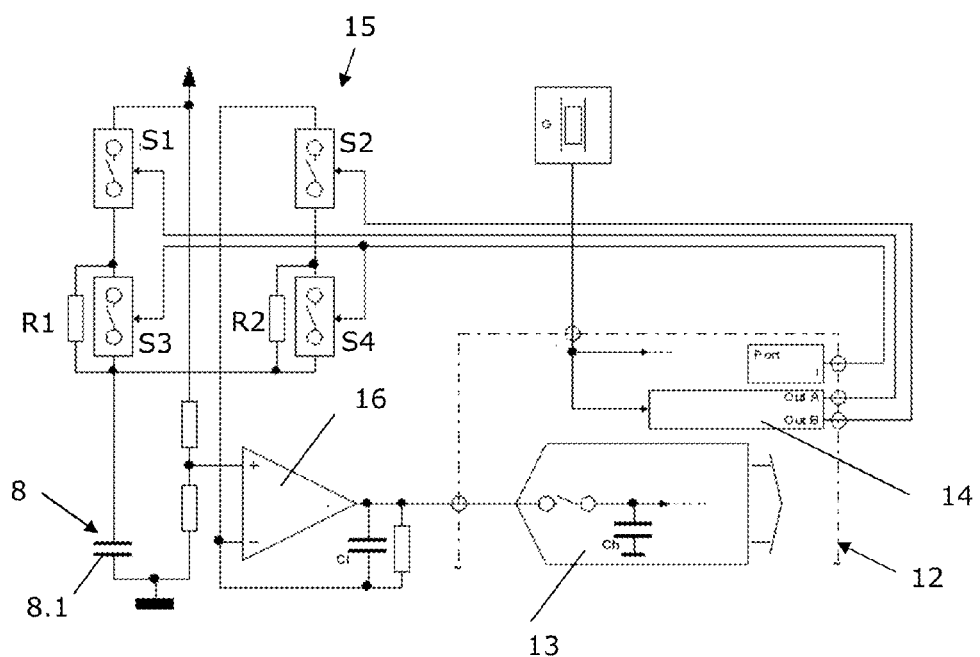
FIG. 3 shows an alternative device for the fill level monitoring of the condensate drain from FIG. 1.

FIG. 3 shows a further embodiment of a monitoring circuit 15 for the fill level monitoring of condensate drain 1 from FIG. 1. By means of monitoring circuit 15, it is possible to detect the electrical capacitance of measuring capacitor changed by external physical influences, here in particular the rise in a liquid level in condensate collecting vessel 4, which is to be used in electronically controlled drain valve 6 for draining concentrate 2 out of compressed air systems.

The basic principle of monitoring circuit 15 is to measure the impedance of the variable capacitance in such a way that the capacitance value and the quality of measuring capacitor 8 results.

FIG. 3 represents the general structure of a microcontroller 12. Microcontroller 12 comprises a high-resolution AD transformer 13 and a timer 14. Timer 14 can be controlled in such a way that two anti-phase pulses of equal length in time can be adjusted without overlapping, with which switching modules $S_1$ and $S_2$ are triggered.

Monitoring circuit 15 comprises measuring capacitor 8, and electrode 8.1 whereof is formed by at least a part of the wall of condensate collecting vessel 4, as well as switches S1 and S2. Measuring capacitor 8 and switches S1 and S2 form an SC element. Furthermore, ohmic resistors R1 and R2 are arranged in series with switching modules S1 and S2. Resistors R1 and R3 can be bypassed by means of switching modules S3 and S4. Monitoring circuit 15 also comprises an operational amplifier 16, which is interconnected as an integrator.

The basis of the method is taken from the mode of functioning of the Switched Capacitor Filter—also known as an SC Filter. It can be seen that the monitoring circuit represents an inverting integrator with a virtual earthing point, as long as switches S3 and S4 are closed. If the monitoring circuit is operated in such a way that S3 and S4 are permanently closed and either S1 or S2 is always closed, a voltage proportional to the ratio between the capacitance to be measured and the integration capacitance arises at the output of the operational amplifier—relative to a virtual earth on the non-inverting input of the operational amplifier. The absolute value of the unknown capacitance of measuring capacitor 8 can thus be determined.

If the quality of measuring capacitor 8 is to be determined, S3 and S4 are permanently opened. The quality of the circuit thus changes in such a way that the quality portion of measuring capacitor 8 becomes relevant to the quality of the circuit. The quality of measuring capacitor 8 can be determined from the change in the output voltage compared to the operation with closed switches S3 and S4.

Measuring capacitor 8 with oil as a dielectric medium between the capacitor electrodes achieves a much worse quality than when the space between the capacitor electrodes is filled with water. This is due to the differing mobility of the molecules and leads to variable losses of the arrangement with the orientation of the molecules according to the applied electric field.

Microcontroller 12 evaluates the quality in addition to the capacitance of measuring capacitor 8 and can draw conclusions as to the proportion of oil in condensate collecting vessel 4, i.e. as to the permittivity of the dielectric medium. On the basis of this information, a discrete value can be acquired for a representation of the degree of filling of condensate collecting vessel 4 that is independent of the nature of the filling.

The invention claimed is:

1. A method for the fill level control of a collecting vessel which is capable of being filled with a dielectric medium, wherein a fill level is monitored by means of a monitoring circuit comprising a measuring capacitor, the capacitance whereof steadily changes in correlation with the fill level at least over a fill level range of the collecting vessel, wherein the monitoring circuit comprises a switched capacitor element (SC element), which includes the measuring capacitor, at least one switching module and at least one ohmic resistor in series with the switching module, the method including the following steps:
   ascertaining a capacitance of the measuring capacitor,
   changing an operating point or a circuit quality of the monitoring circuit by increasing the electrical resistance of the at least one ohmic resistor in series with the at least one switching module or by changing a pulse/pause ratio of a switching frequency for the SC element;
   ascertaining a quality factor of the measuring capacitor by determining the difference between output voltages of the monitoring circuit before and after the operating point or the circuit quality factor of the monitoring circuit is changed;
   determining a permittivity of the dielectric medium on a basis of the ascertained quality factor of the measuring capacitor,
   determining a fill level of the dielectric medium in the collecting vessel on a basis of the ascertained capacitance of the measuring capacitor and the permittivity of the dielectric medium,
wherein
   a fill level-dependent drainage of the dielectric medium from the collecting vessel is performed.

2. The method according to claim 1, wherein the dielectric medium is drained out of the collecting vessel when a preset fill level is reached in the collecting vessel.

3. A monitoring circuit for the fill level monitoring of a collecting vessel, which is capable of being filled with a dielectric medium, the monitoring circuit comprises: at least one measuring capacitor which can be assigned to a collecting vessel such that a capacitance of said measuring capacitor is steadily changing in correlation with a fill level at least over a fill level range of the collecting vessel, wherein the monitoring circuit is configured such that the capacitance of the measuring capacitor and a quality factor of the measuring capacitor is ascertained and conclusions are drawn as to a permittivity of the dielectric medium on a basis of the ascertained quality factor of the measuring capacitor, wherein a fill level of the dielectric medium in the collecting vessel is ascertained as a function of the ascertained capacitance of the measuring capacitor and the ascertained permittivity of the dielectric medium, the monitoring circuit further including the quality factor of the measuring capacitor being ascertained by determining a difference between output voltages of the monitoring circuit before and after a change in an operating point or a circuit quality factor of the monitoring circuit, wherein the monitoring circuit further includes a switched capacitor element (SC element) that includes the measuring capacitor and at least one switching module and wherein in order to change the operating point or the circuit quality factor, at least one ohmic resistor in series with the at least one switching module is increased or a pulse/pause ratio of a switching frequency for the SC element is changed.

4. The monitoring circuit according to claim 3, wherein a resistor in series with the SC element is changed in order to switch between a first operating state and a second operating state.

5. The monitoring circuit according to claim 3, wherein switchover times of the SC element are varied at least in a second operating state.

6. An arrangement comprising a monitoring circuit according to claim 3 and a collecting vessel, wherein a measuring capacitor electrode is made available at least in part by the collecting vessel.

7. A controlled condensate drain valve for draining condensate from a condensate drain, wherein the condensate drain valve comprises a monitoring circuit for the fill level monitoring of a condensate collecting vessel according to claim 3.

8. The condensate drain valve according to claim 7, wherein the condensate drain valve is configured such that a degree of opening of the condensate drain valve is controlled by means of the monitoring circuit.

9. A condensate drain comprising a condensate collecting vessel and a condensate drain valve according to claim 7.

10. The monitoring circuit according to claim 3, wherein the monitoring circuit is designed such that the monitoring circuit is switched between a first operating state and a second operating state, wherein the capacitance of the measuring capacitor is ascertained in the first operating state and the quality factor of the measuring capacitor is ascertained in the second operating state.

11. The monitoring circuit according to claim 10, wherein in the second operating state, at least one high-ohmic resistor is connected in series with at least one switching module.

12. The monitoring circuit according to claim 11, wherein a resistor in series with the switching module has a low resistance or is bypassed in the first operating state.

* * * * *